(12) United States Patent
Ballan et al.

(10) Patent No.: US 9,458,059 B2
(45) Date of Patent: Oct. 4, 2016

(54) PROCESS FOR THE CALCINATION AND MANUFACTURE OF SYNTHETIC POZZOLAN

(75) Inventors: James Ballan, Danielsville, PA (US); Ove Lars Jepsen, Emmaus, PA (US); Peter Paone, North Catasaqua, PA (US); John S. Salmento, Nazareth, PA (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 12/966,345

(22) Filed: Dec. 13, 2010

(65) Prior Publication Data
US 2012/0145042 A1 Jun. 14, 2012

(51) Int. Cl.
| | |
|---|---|
| *C04B 20/04* | (2006.01) |
| *C04B 14/10* | (2006.01) |
| *F27B 7/20* | (2006.01) |
| *F27B 7/00* | (2006.01) |
| *F27D 17/00* | (2006.01) |

(52) U.S. Cl.
CPC ............ *C04B 20/04* (2013.01); *C04B 14/106* (2013.01); *F27B 7/20* (2013.01); *F27B 7/2033* (2013.01); *F27D 17/004* (2013.01); *F27D 17/008* (2013.01)

(58) Field of Classification Search
CPC ..... C04B 14/106; C04B 14/10; C04B 20/04; C04B 7/12; C04B 33/04; F27B 7/2033

USPC ............................................ 502/72; 423/331
See application file for complete search history.

(56) References Cited

U.S. PATENT DOCUMENTS

| | | | | | |
|---|---|---|---|---|---|
| 2,339,808 | A | * | 1/1944 | Ravnestad et al. ............. | 423/80 |
| 3,169,075 | A | * | 2/1965 | Morrow, Jr. et al. ......... | 428/145 |
| 4,531,304 | A | | 7/1985 | Wauhop, Jr. et al. | |
| 4,962,279 | A | * | 10/1990 | Anderson et al. ............ | 501/150 |
| 5,900,040 | A | * | 5/1999 | Harris et al. .................... | 75/435 |
| 2003/0106467 | A1 | | 6/2003 | Jones | |
| 2004/0129177 | A1 | * | 7/2004 | Cadoret ........................ | 106/486 |
| 2006/0201395 | A1 | | 9/2006 | Barger et al. | |
| 2007/0290085 | A1 | * | 12/2007 | Nemeh et al. .................. | 241/36 |
| 2008/0264295 | A1 | * | 10/2008 | Taylor et al. .............. | 106/31.13 |

OTHER PUBLICATIONS

International Search Report and Written Opinion dated Apr. 4, 2012, 8 pages.

* cited by examiner

*Primary Examiner* — Kaj K Olsen
*Assistant Examiner* — Karam Hijji
(74) *Attorney, Agent, or Firm* — Daniel DeJoseph; Matthew R. Weaver (57) ABSTRACT

Disclosed is a process for the calcining and manufacturing of synthetic pozzolan with desirable color properties. Feed material is dried, crushed, and preheated in a drier crusher. The dry, crushed material is collected and fed to a calciner where it is heated to become a synthetic pozzolan. The synthetic pozzolan is then fed to a cooler where it is maintained for a least a portion of the cooling step in a reducing atmosphere.

10 Claims, 6 Drawing Sheets

PROCESS FOR THE CALCINATION AND MANUFACTURE OF SYNTHETIC POZZOLAN

BACKGROUND OF THE INVENTION

There is currently a large amount of attention being paid to the use of additive materials in cement in order to maintain or increase the strength of the cement while reducing the overall energy required to produce the material. In practice, a number of natural and manufactured materials are added to clinker in order to reduce the need for clinker minerals in the cement. These materials include limestone, waste slag from the manufacture of steel and iron, and naturally occurring pozzolan. Disadvantages exist to the use of these materials in practice. Quality concerns limit the introduction of limestone, as limestone naturally provides little to the strength of the finished product. Certain types of slag can be utilized positively for the introduction of strength to cement, but as a waste product of the manufacture of other compounds, the slag often does not have a consistent chemistry. Slags can also contain large amounts of free iron, which can cause premature wear of grinding elements used in the manufacture of cement. Pozzolan provides positive strength development in finished cement, but as a naturally occurring material, is not generally available in locations where the primary raw materials used in the manufacture of cement are mined.

In recent years, a number of processes have gained prominence in the production of artificial pozzolan from the calcining of clay. The manufacture of artificial pozzolan requires lower temperatures and less energy than the production of cement clinker, and is therefore gaining importance among cement manufacturers for its lower cost of production, as well as the positive effects of producing lower emissions (particularly $CO_2$).

In practice, however, while the chemistry may be consistent with a positive effect on strength development, the production of these artificial pozzolans may create materials which are colored differently than the clinker used in the manufacture of cement. This is problematic where the color of the finished product is an important concern, such as when multiple sources of cement may be used for a single project. These issues with the coloration of the final product serve to limit the introduction of these synthetic pozzolans in the production of cement.

Therefore, it is an object of the present invention to provide a method for producing synthetic pozzolan having desired color characteristics, and in particular having a light grey color that many cement producers find desirable.

BRIEF DESCRIPTION OF THE INVENTION

The above and other objects are achieved by the process of the present invention according to which the coloration of the artificial pozzolan produced may be controlled as desired. Having a synthetic pozzolan product with desirable color characteristics will enable the end user to introduce higher amounts of pozzolan into the finished cement, thus resulting in a higher quality product produced utilizing lower fuel consumption than other cement producing systems.

The invention broadly comprises breaking apart a raw clay material, preferably a kaolinic clay, to a small feed size, calcining the clay to a product pozzolan, and then by affecting the oxidation state of the color-producing components of the artificial pozzolan product, particularly iron and aluminum, through the creation of localized reducing conditions as the pozzolan product cools to a temperature below its color-stabilizing temperature, which color-stabilizing temperature is determined by the amount and identity of color-producing components in the raw materials and therefore in the resulting synthetic pozzolan.

More specifically, wet kaolinic raw feed materials including clay are fed to a device for sufficient material drying and disagglomeration/crushing of larger material (a "drier crusher"). The product from the drier crusher is collected in a cyclone, and directed to a calciner. Fuel is fed to the calciner to maintain an exit temperature from the calciner that will provide sufficient dehydration and calcinations of the product. The feed material is calcined at least to a temperature (the "activation temperature") at which the pozzolanic properties, such as the strength of the end material, are optimized and at which, in effect, the raw kaolinic material is converted to a synthetic pozzolan. This activation temperature will generally range between about 700° C.-900° C., depending upon the properties of the specific kaolinic raw material being utilized.

The product from the calciner is collected, such as in a collection cyclone, and the material is fed to a cooler where it is cooled from its activation temperature. The gases from the collector may optionally be used for drying and conveying material through the drier crusher. Reducing conditions are maintained in the cooler for at least a portion, and most preferably the initial portion, of the cooling process. When only a portion of the process of cooling the synthetic pozzolan from its activation temperature to its color-stabilizing temperature is performed under reducing conditions, it is preferred that the balance of the cooling process be performed in an oxygen depleted environment.

Pozzolan material fed to the cooler may be treated with a small amount of fuel (preferably oil) to maintain a reducing atmosphere near the material inlet. Further into the cooler, water may be optionally sprayed to assist in cooling of the pozzolan to below its color-stabilizing temperature while maintaining a low oxygen environment. Alternatively, an oxygen depleted gas can be passed through the cooler along with or in place of the water vapor to cool the pozzolan to below its color-stabilizing temperature while maintaining a low oxygen environment. The product from the cooler may then be introduced into one or more optional additional coolers, such as a cyclone cooling system, for further cooling. If the material entering the any additional downstream coolers is at a temperature below its color-stabilizing temperature, a reducing or oxygen-depleted atmosphere will not have to be maintained in such additional cooler. The finally cooled product is thereafter collected. The preheated gases from any additional cooler may be optionally directed to the calciner as hot tertiary air.

DESCRIPTION OF THE DRAWINGS

The invention is described with reference to the drawings, in which like numerals represent similar elements, and in which.

DETAILED DESCRIPTION OF THE INVENTION

Figure 1:
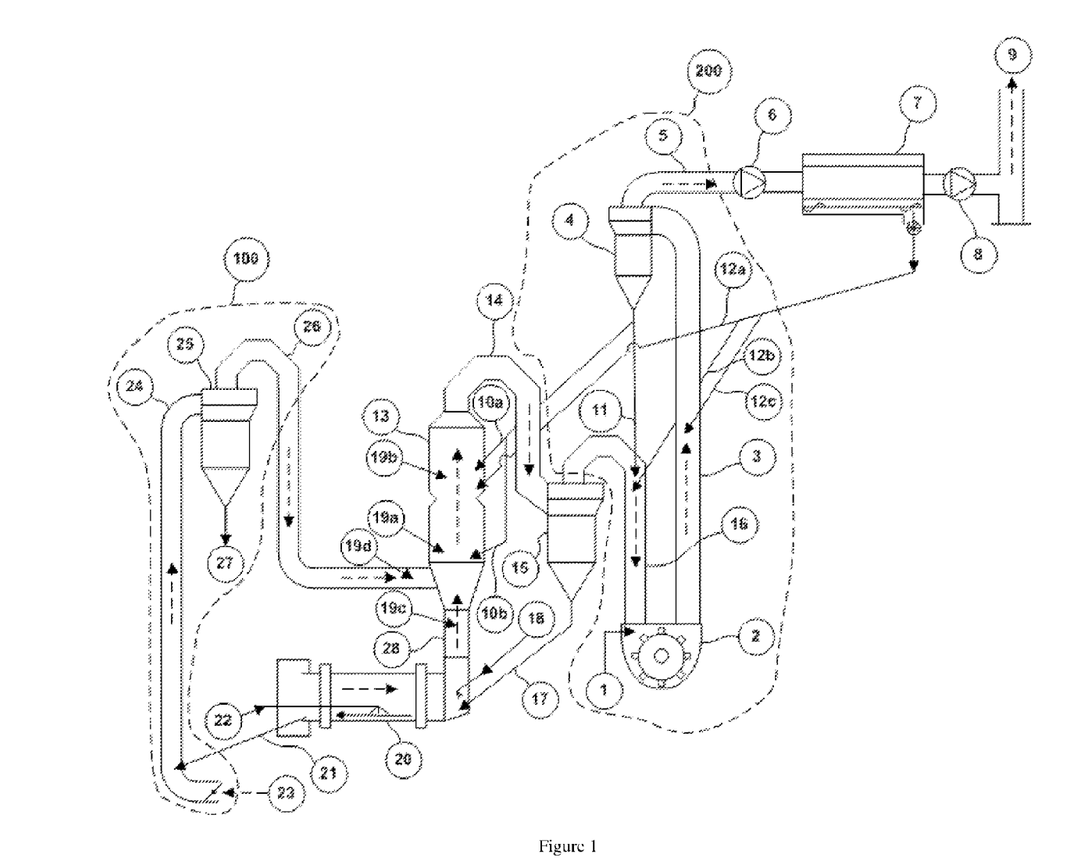
FIG. 1 is a diagram of one embodiment of a calcining system for manufacture of synthetic pozzolan of a suitable coloration, in which a flash calciner is utilized.

In all the figures, dashed arrows represent the flow of gas, while solid arrows represent the flow of solid material. With reference to FIG. 1, raw clay material 1 is directed to the drier crusher 2 where the material is crushed to less than 5 mm and preheated and dried from a initial moisture content ranging from about 5% (wt) to about 35% to a moisture content of from about 0.025% to about 2.5% by the hot gas in duct 16 from the calciner cyclone 15. The dried, crushed material is of a size suitable to be suspended and conveyed in a gas stream through duct 3 to the drier crusher cyclone 4 where it is separated from the gas stream. The gas stream 5 is pulled by an optional ID fan 6. After the ID fan 6, any remaining fine dust is removed by dust collector 7. After the dust collector the gas is pulled by ID fan 8 and exits the system via stack 9. The fine dust from dust collector 7 is directed either (a) to the calciner 13 via chute 12a; (b) to duct 16 via 12b and thereafter into drier crusher 2; or (c) to duct 3 via chute 12c and thereafter into drier crusher cyclone 4.

Most of the dried, crushed material collected in the drier crusher cyclone 4 is directed to the calciner 13 via chutes 10a or 10b. Optionally, a small amount of the dried, crushed material collected in the drier crusher cyclone 4 may be directed to duct 16 for temperature control of the gas in duct 16. The calciner 13 shown in FIG. 1 is an updraft calciner where the combustion air enters through duct 26 into the lower portion of the calciner. Water vapor and/or oxygen depleted gas and some vaporized fuel from inlet 18 enter the calciner through the riser 28. Fuel can be directed into the calciner 13 or the duct 26 leading to the calciner through a single location or multiple locations 19a, 19b, 19c and 19d. The number of fuel locations and the proportion of the fuel depend upon the properties of the fuel and the need to control the combustion in the calciner 13. Optionally, a stoichiometric excess of fuel may be utilizing in calciner 13 to promote calcination under reducing conditions.

The crushed, dried materials can be directed into the calciner 13 through a single location or multiple locations 10a and 10b. The split of material in chutes 10a and 10b is determined by the de-hydration and activation properties of the raw materials and the split also can be used to help control the combustion of the fuel in the calciner 13. In the calciner the hydrated moisture will be dried off and the material will be calcined to its activation temperature. The desired activation temperature in the calciner 13 will depend on the chemistry of the feedstock and the associated minerals in the clay feed and will be between 500° C. and 900° C. and most prevalently between about 700° C. and 850° C. Most of the synthetic pozzolan will thereafter become entrained in the gas stream in the calciner 13 and exit via duct 14.

The entrained pozzolan in duct 14 is captured by the calciner cyclone 15 and directed to cooler 20, which as depicted is a rotary cooler, via chute 17. A small amount of fuel, between 10 to 40 kcal fuel per kg of synthetic pozzolan, is added to the synthetic pozzolan via inlet 18 and preferably immediately prior to the pozzolan entering cooler 20. The preferred fuel is fuel oil. The fuel creates local reducing conditions, i.e., an oxygen deleted or low (from about 0% to about 5% by volume) oxygen environment and either CO and/or volatized hydrocarbons, near the synthetic pozzolan during at least the initial part of the cooling process. Downstream from the cooler area in which the small amount of fuel was added, water sprayer 22 is utilized to spray water onto the calcined pozzolan to contribute to cooling the pozzolan below the color-stabilizing temperature of the color producing metals, particularly iron, which generally between about 150° C. and about 600° C., and more typically between about 180° C. and about 400° C., with the actual color-stabilizing temperature depending on the composition of the pozzolan, and specifically the amount of iron content. Since the calcined pozzolan is kept well above 100° C. the calcined pozzolan remains dry. The water vaporizes upon contact with the hot pozzolan. The generated water vapor occupies most of the space inside the cooler 20, this helps to maintain an oxygen depleted atmosphere (i.e. no more than about 10% oxygen) in that portion of the cooler which retards the oxidation of metals. The water vapor exits the cooler 20 via the riser 28. A portion of the fuel oil will volatilize and exit the cooler 20 via the riser 28. In addition some CO produced by burning the fuel and excess water vapor will exit cooler 20 via riser 28. By preventing the oxidation of iron, in particular, and other metals including aluminum, magnesium, manganese and chromium during the cooling process, the pozzolan is prevented from changing to a reddish or other color and may be fixed as white or light grey.

As a supplement or alternative to using water as described above an oxygen depleted gas can be passed through the cooler to cool the pozzolan below the color-stabilizing temperature of the color producing metals. Two possible sources of the oxygen depleted can be the exhaust stream 9 or the gas exiting fan 6; however, any oxygen depleted gas can be used.

In an optional embodiment, the objects of the invention can be achieved if the clay is calcined into pozzolan under reducing conditions by utilizing a sufficient amount of excess fuel during the calcining process and thereafter continuing to cool to the "color-stabilizing temperature" under reducing and/or oxygen depleted conditions.

The term "color-stabilizing temperature" as used herein means the temperature at which the pozzolan can continue cooling, such as in ambient air, without significant oxidation of the primary color-producing species in the pozzolan taking place. This temperature will vary according to the relative proportion by weight of color-producing species, which is defined as those compounds which go from a white or light grey shade to a red or other color when oxidized, and which constitute primarily iron, but also to a lesser extent aluminum, chromium, manganese, titanium and magnesium, in the cooling pozzolan material. Typically, this temperature will range from about 180° C. to about 400° C. If oxidation of a substantial (i.e. at least 90 wt percent) amount of the primary color-producing species is inhibited while the material is cooled to its color-stabilizing temperature, the final cooled product will typically have a light grey shade.

The activation and color stabilization temperatures, as defined herein, for a given sample of material can be determined by one skilled in the art by a number of test procedures. For example, the activation temperature for a given clay sample may be determined by running a furnace test or a thermogravimetric analysis on the sample and the color stabilization temperature may be determined by running thermal studies on the cooling synthetic pozzolan material made from said raw material.

As used herein, the term "reducing conditions" or "reducing atmosphere" means that the overall conditions in the cooler (or the calciner) favor reduction of the color-changing species in the pozzolan. As used herein, the term "oxygen depleted" or "oxygen deprived" atmosphere or conditions means that while overall conditions do not promote reduction of the color-changing species in the pozzolan, there is also not sufficient oxygen to promote their oxidation.

The synthetic pozzolan exits the cooler 20 via chute 21 and is directed into duct 24 where it is further cooled by air 23. The entrained synthetic pozzolan is captured by cyclone 25 and leaves the system as the synthetic pozzolan product 27. The air preheated by the synthetic pozzolan exits cyclone 25 and is directed to the calciner 13 via duct 26. The temperature of the air in duct 26 will be almost the same as the product 27.

Figure 2:
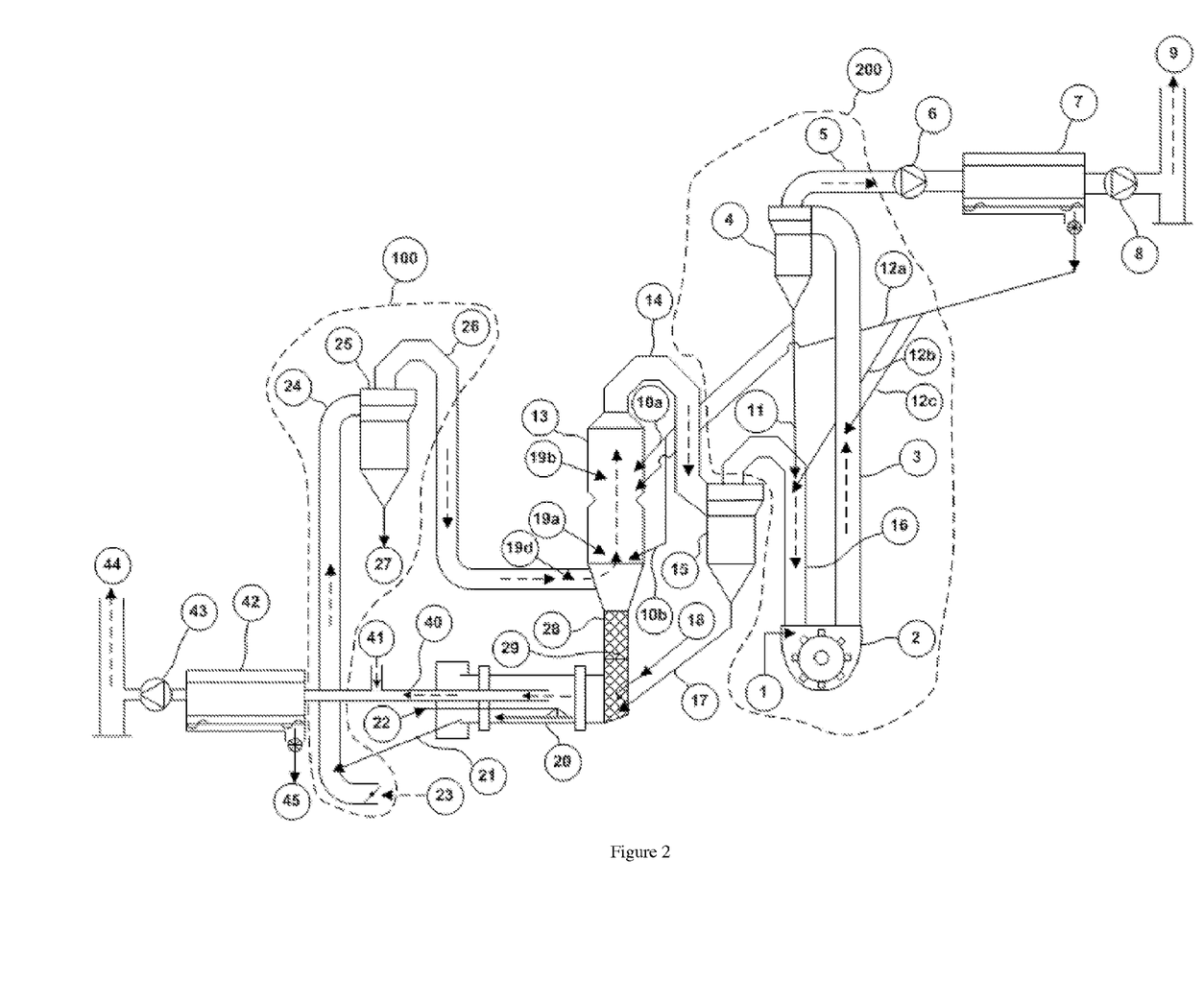
FIG. 2 is a second embodiment of a system for manufacture of synthetic pozzolan.

FIG. 2 shows another embodiment of this invention. This embodiment is identical to the embodiment shown in FIG. 1 and described above except that all or most of the water vapor and/or oxygen depleted gas is pulled out of the cooler 20 via duct 40. This embodiment increases the fuel efficiency of the system since the water vapor and/or oxygen depleted gas is not heated in the calciner 20. Ambient air 41 is drawn into or injected into duct 40 to lower the dew point temperature and prevent corrosion in the downstream ductwork and dust collector 42. Any dust captured in the exhaust duct 40 leaves the system as synthetic pozzolan product 45. The water vapor, oxygen deleted gas, and ambient air is pulled through the dust collector 42 and exits the system via stack 44. In this embodiment ID fans 43 and 8 are operated in balance with each other so that the gas, primarily water vapor and/or oxygen depleted gas, in a small area in region 29, (hashed area in FIG. 2), is stagnant. The gas in this small area in region 29 will not consistently move either to the calciner 13 or to the cooler 20.

Figure 3:
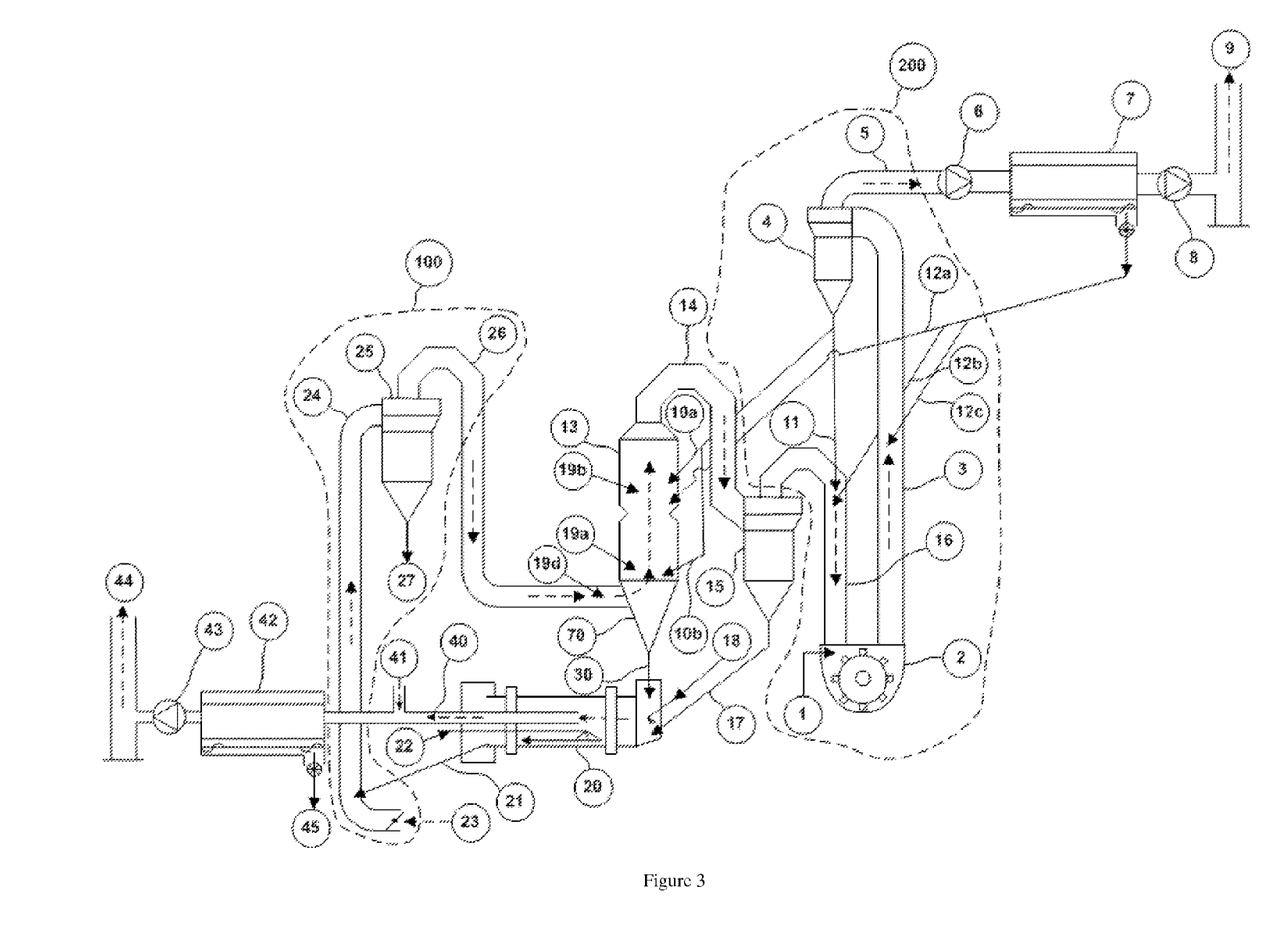
FIG. 3 is a third embodiment of a system for manufacture of synthetic pozzolan.

FIG. 3 shows another embodiment of this invention. This embodiment is identical to the embodiment shown in FIG. 2 and described in the previous paragraph, except that that the riser 28 is replaced by hopper 70 and chute 30. Any material that may build up in the calciner 13 and is cleaned out is conveyed to the cooler via chute 30. This allows the ID fans 8 and 43 to be operated independently without upsetting conditions in either calciner 13 or cooler 20 thereby allowing all the water vapor, oxygen depleted gas and volatilized fuel to exit cooler 20 via duct 40.

Optional region 100 in FIGS. 1, 2 and 3 shows a single stage (one cyclone), counter current heat exchanger that preheats a portion of the hot gas in duct 26, which is combustion gas for the calciner, and correspondingly pozzolan product 21 from rotary cooler 20. This single stage cyclone can be replaced by multiple stages which will increase the heat captured from pozzolan product 21 and raise the temperature of the hot gases in duct 26 to the calciner 13. As the number of stages increases, the temperature of the gas in duct 26 will increase while the temperature of pozzolan product 21 will decrease. As the number of stages is increased, the heat returned to the calciner is increased and the fuel consumption will decrease. Therefore, the preferable number of cyclones, (if any), will depend upon the temperature of the pozzolan exiting the cooler and the tradeoff between the capital cost of the cyclones versus the operational cost savings.

Figure 4:
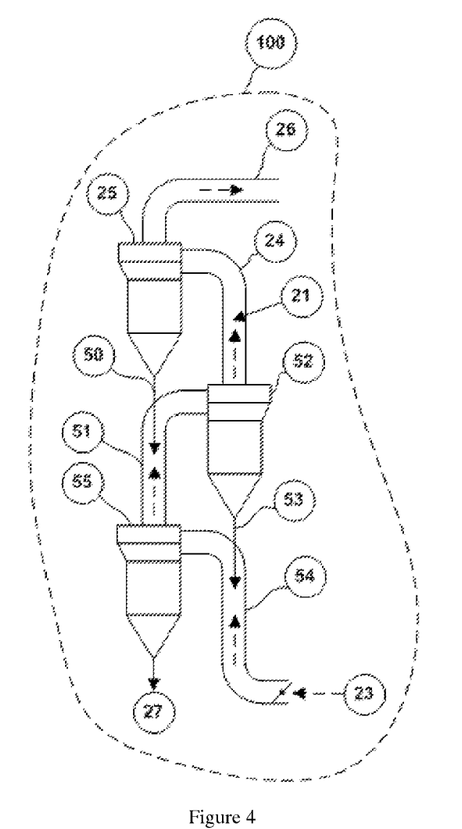
FIG. 4 is another embodiment of heat exchanger region 100 with three cyclones 25, 52, 55 being used as a counter current heat exchanger to capture more heat from the synthetic pozzolan 21 to increase the temperature of the combustion air 23 in duct 26 which subsequently enters flash calciner 13.

In the embodiment of FIG. 4, region 100 is modified by the addition of two more cooling cyclones 52 and 54 which serves to cool the synthetic pozzolan 21 and correspondingly heat cooling air 23. The use of multiple stage cyclones will increase the heat captured from the synthetic pozzolan 21 and raise the temperature of the combustion air 23 in duct 26 which is subsequently used in the calciner 13. With only a single stage, the synthetic pozzolan product 27 and the air in duct 26 have approximately the same temperature. As the number of stages increases, the temperature of the air in duct 26 will increase—while the temperature of synthetic pozzolan product will decrease. In this embodiment, the synthetic pozzolan exits the cooler 20 (as per FIGS. 1-3) via chute 21 and is directed into duct 24 where it is cooled by the air from cyclone 52. The entrained synthetic pozzolan is captured by cyclone 25 and is directed to duct 51 via chute 50. The air preheated by the synthetic pozzolan exits cyclone 25 and is directed to the calciner 13 via duct 26. The synthetic pozzolan in duct 51 is transported to cyclone 52 where it is captured and directed to duct 54 via chute 53. The synthetic pozzolan in duct 54 is transported to cyclone 55 where it is captured and leaves the system as product 27.

Region 200 in FIGS. 1, 2 and 3 shows a single stage (one cyclone), counter current heat exchanger that preheats a portion of the raw material by inserting it in duct 16, which is off gas from the calciner, and correspondingly cooling the gas in duct 16. This single stage cyclone can be replaced by multiple stages which will increase the heat captured from the gas in duct 16 and raise the temperature of the dried, crushed material in chutes 10*a* and 10*b*. When only a single stage cyclone 4 is utilized, the dried, crushed material in chutes 10*a* and 10*b* and the gas in duct 5 have approximately the same temperature. As the number of stages increase, the temperature of the gas in duct 5 will decrease, while the temperature of the dried, crushed material in chutes 10*a* and 10*b* will increase. However, as the number of stages is increased, the drying capacity of the drier crusher will be reduced, while the fuel consumption in the calciner will decrease. Therefore, the preferable number of cyclones will depend upon the moisture content of the raw material and the tradeoff between the capital cost of the cyclones versus the operational cost savings.

Figure 5:
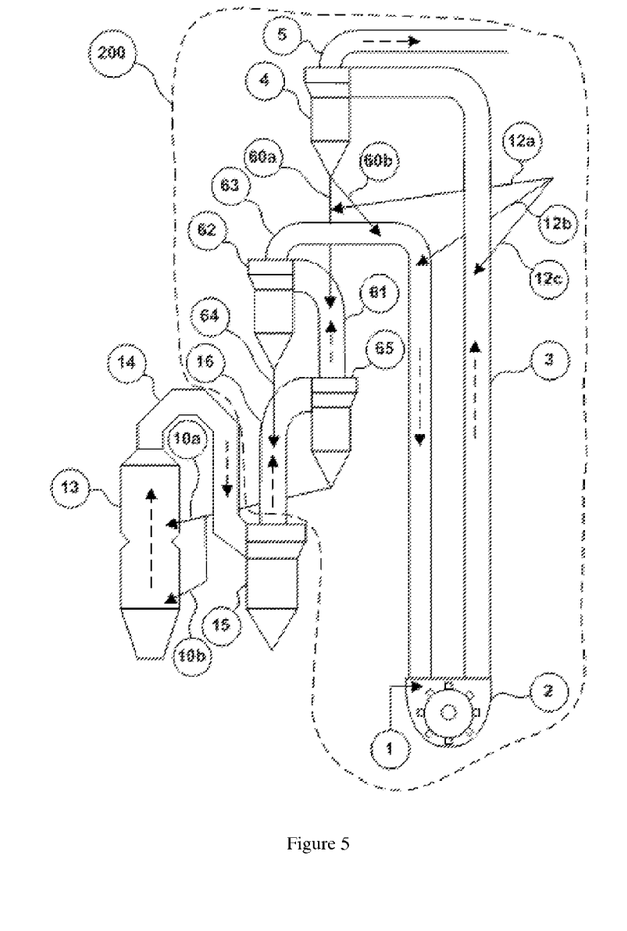
FIG. 5 is another embodiment of heat exchanger region 200 with three cyclones 4, 62, 65 being used as a counter current heat exchanger to capture more heat from the calciner exhaust gas to increase the temperature of the dried, crushed material in chutes 10a or 10b.

Per FIG. 5, raw material 1 is directed to the drier crusher 2 where the material is crushed to its desired sized, preheated and dried by the hot gas in duct 63 coming from cyclone 62. The dried, crushed material is conveyed in duct 3 to the drier crusher cyclone 4 where it is separated from the gas stream. The gas stream 5 is pulled by an optional ID fan 6 (not shown in FIG. 5). The fine dust 12 from dust collector 7 (not shown in FIG. 5) is to the duct 61 via chute 12*a* or to duct 63 via 12*b* and thereafter into drier crusher 2 or to duct 3 via chute 12*c* and thereafter into drier crusher cyclone 4.

Most of the dried, crushed material collected in drier crusher cyclone 4 is directed to the duct 61 via chutes 60*a*, while some the dried, crushed material collected in drier crusher cyclone 4 may be directed to duct 63 via chute 60*b* for temperature control of the gas in duct 63. The dried, crushed material in duct 61 is transported to cyclone 62 where it is captured and directed to duct 16 via chute 64. The dried, crushed material in duct 16 is transported to cyclone 64 where it is captured and directed to the calciner 13 via chutes 10*a* and 10*b*.

Figure 6:
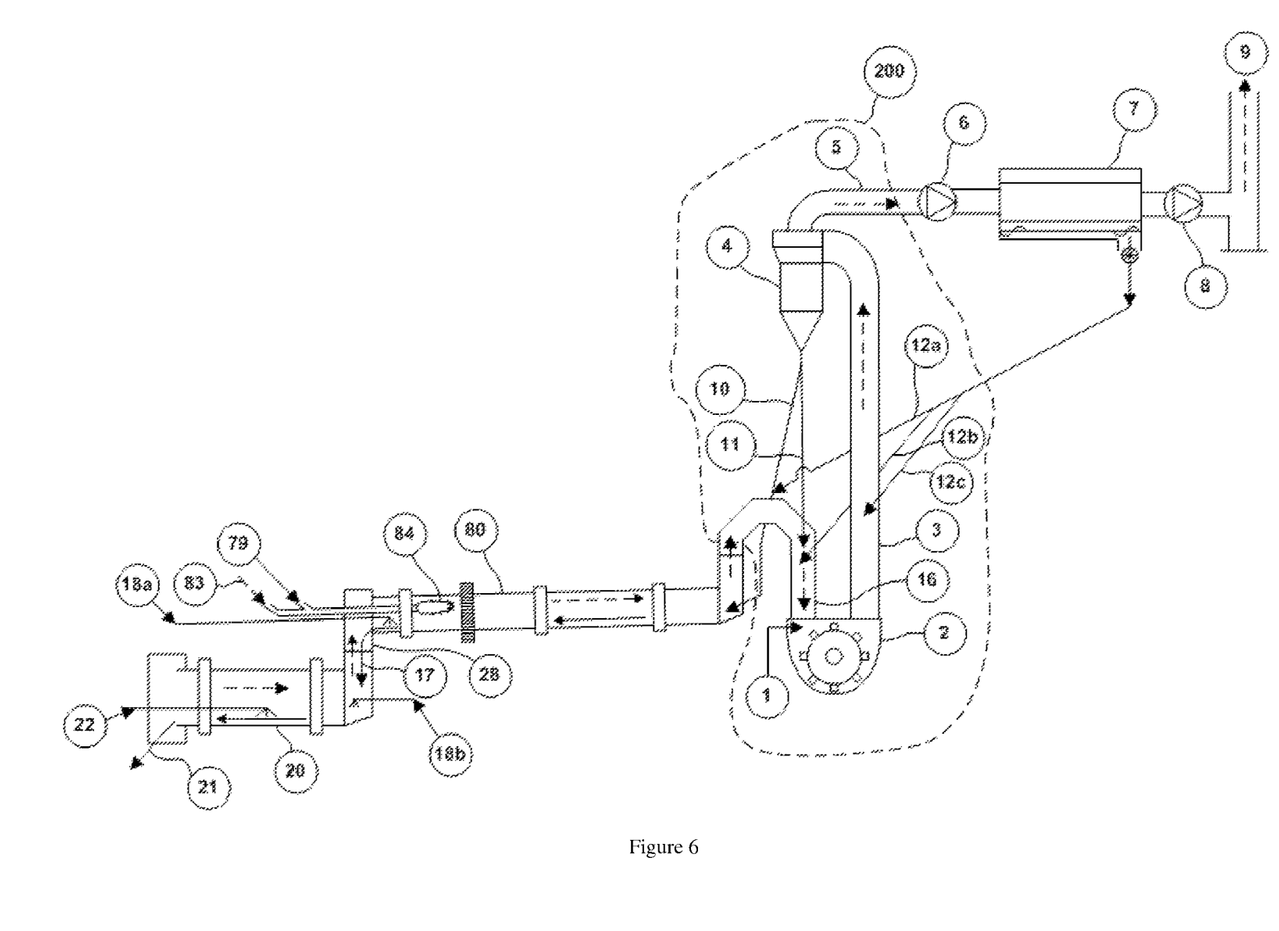
FIG. 6 is an embodiment of a kiln system for manufacture of synthetic pozzolan of a suitable coloration in which a rotary kiln is used for processing raw clay.

FIG. 6 depicts an embodiment of the invention in which a rotary kiln is utilized as the calciner rather than the flash calciner depicted in the various embodiments set forth in FIGS. 1-3 herein. When using a rotary kiln as the calciner, the front end of the process, that is, the drying and crushing steps, is essentially similar to what is utilized with a flash calciner. In this regard, the embodiment set forth in FIG. 5 may be utilized with a rotary kiln.

According to FIG. 6, crushed and dried feed material is inserted into rotary kiln 80 via conduit 10. Fuel is added through inlet 79 and combined with combustion air added via inlet 83 to produce a flame 84 at the end of the kiln opposite where the raw material enters to thereby heat the combustion gases. The material travels through the kiln in countercurrent relation to the heated gases in the kiln and is calcined. Pozzolan exits the kiln via duct 28 and enters rotary cooler 20. In duct 28 gas from cooler 20 is directed to rotary kiln 80. As with the flash calciner, the pozzolan is exposed to a low oxygen environment within rotary cooler 20, due to the introduction of fuel oil, via inlet 18b, near the material entrance into the cooler 20. The low oxygen environment within cooler 20 is further promoted by the spraying of water onto the synthetic pozzolan and/or by passing an oxygen depleted gas through the cooler.

Optionally, fuel oil may also be inserted behind flame 84 in rotary kiln 80, via inlet 18a, to begin exposing the synthetic pozzolan to a low oxygen environment in an area of the kiln in which the temperature experienced by the pozzolan begins to decrease from the maximum temperatures experienced within the kiln. The insertion of fuel oil in the rotary kiln will always be done in concert with maintaining at least a portion of cooler 20 under reducing conditions. In addition, cooler 20 may also provide for the removal of water vapor and oxygen depleted gas through a dust collector in the manner depicted in FIGS. 2 and 3.

What is claimed is:

1. A method of producing a synthetic pozzolan having a grey color comprising
   heat treating a kaolinic raw material to an activation temperature at which the kaolinic raw material is converted to a synthetic pozzolan providing positive strength development in finished cement; and
   cooling the synthetic pozzolan from said activation temperature to the color-stabilizing temperature of the pozzolan,
   wherein at least a portion of said cooling step is conducted in an atmosphere containing no more than about 5% by volume oxygen and CO and/or volatized hydrocarbons wherein the kaolinic raw material is dried in off gases from the heat treating step and is thereafter crushed in the presence of said off gases, with the crushed raw material becoming suspended in said off gases.

2. The method of claim 1 wherein a portion of the cooling step is conducted in an atmosphere containing no more than about 5% by volume oxygen and CO and/or volatized hydrocarbons, with the balance of the cooling step being conducted in an oxygen depleted environment.

3. The method of claim 1 wherein the atmosphere containing no more than about 5% by volume oxygen and CO and/or volatized hydrocarbons is produced by adding fuel to the pozzolan after the heat treating step and immediately prior to the cooling step.

4. The method of claim 3 where the fuel is a liquid fuel.

5. A method of producing a synthetic pozzolan with a grey color comprising
   heat treating a kaolinic raw material to an activation temperature at which the kaolinic raw material is converted to a synthetic pozzolan providing positive strength development in finished cement; and
   performing a cooling step on the synthetic pozzolan in which the synthetic pozzolan is inserted via a material inlet into a cooler in which the synthetic pozzolan is cooled from said activation temperature to the color-stabilizing temperature of the pozzolan, wherein during said cooling step an environment in which there is no more than about 5% by volume oxygen and CO and/or volatized hydrocarbons is maintained near the material inlet and
   wherein the remaining portion of said cooling step is conducted in said environment or under oxygen deprived wherein the kaolinic raw material is dried in off gases from the heat treating step and is thereafter crushed in the presence of said off gases, with the crushed raw material becoming suspended in said off gases.

6. The method of claim 5 wherein the crushed material is separated from the off gases, after which said crushed kaolinic raw material is subjected to the heat treating step.

7. The method of claim 5 wherein the heat treating step takes place in a rotary kiln.

8. The method of claim 5 wherein the heat treating step takes place in an updraft calciner.

9. The method of claim 5 wherein the oxygen deprived conditions are maintained by injecting water onto the pozzolan during the cooling step.

10. The method of claim 5 wherein the oxygen deprived conditions are maintained by contacting the pozzolan with an oxygen depleted gas during the cooling step.

* * * * *